(12) United States Patent
Christin et al.

(10) Patent No.: US 8,982,914 B2
(45) Date of Patent: Mar. 17, 2015

(54) METHODS FOR TRANSMITTING AND RECEIVING DATA USING A PLURALITY OF RADIO CHANNELS, TRANSMISSION AND DESTINATION DEVICES, CORRESPONDING SIGNAL AND COMPUTER PROGRAM

(75) Inventors: Philippe Christin, Rennes (FR); Laurent Cariou, Rennes (FR); Getachew Redieteab, Janze (FR)

(73) Assignee: Orange, Paris (FR)

( * ) Notice: Subject to any disclaimer, the term of this patent is extended or adjusted under 35 U.S.C. 154(b) by 5 days.

(21) Appl. No.: 13/583,532

(22) PCT Filed: Mar. 4, 2011

(86) PCT No.: PCT/FR2011/050457
§ 371 (c)(1),
(2), (4) Date: Nov. 29, 2012

(87) PCT Pub. No.: WO2011/110779
PCT Pub. Date: Sep. 15, 2011

(65) Prior Publication Data
US 2013/0064194 A1   Mar. 14, 2013

(30) Foreign Application Priority Data
Mar. 8, 2010   (FR) ...................................... 10 51670

(51) Int. Cl.
*H04W 72/04*   (2009.01)
*H04L 12/801*   (2013.01)
*H04W 28/06*   (2009.01)

(52) U.S. Cl.
CPC .............. *H04L 47/10* (2013.01); *H04W 28/065* (2013.01)
USPC ........................................... 370/537; 370/531

(58) Field of Classification Search
CPC ................................................... H04N 21/2368
USPC ..................................... 370/537, 531
See application file for complete search history.

(56) References Cited

U.S. PATENT DOCUMENTS 8,081,665 B2 *  12/2011  Gorshe et al. ................. 370/535
8,503,367 B2 *   8/2013  Liu et al. ....................... 370/328
(Continued)

FOREIGN PATENT DOCUMENTS

EP          1775885 A2     4/2007

OTHER PUBLICATIONS

International Search Report and Written Opinion dated May 11, 2011 for corresponding International Application No. PCT/FR2011/050457, filed on Mar. 4, 2011.
(Continued)

*Primary Examiner* — Jay P Patel
(74) *Attorney, Agent, or Firm* — David D. Brush; Westman, Champlin & Koehler, P.A.

(57) ABSTRACT

A method and apparatus are provided for transmitting data packets in a communication network using a plurality of radio channels. The network is organized into a plurality of communication layers including a data link layer MAC and a physical layer PHY. The method includes aggregating data packets to be transmitted to a single recipient, in the MAC layer, outputting at least two aggregated packets, with which a single header of the PHY layer is associated. At least two of the radio channels are concatenated to form a concatenated channel. The aggregated packets are simultaneously transmitted respectively over at least two separate concatenated sub-channels, one concatenated sub-channel including at least one of the radio channels of the concatenated channel.

12 Claims, 5 Drawing Sheets

(56) References Cited

U.S. PATENT DOCUMENTS

| | | | |
|---|---|---|---|
| 8,509,193 B2* | 8/2013 | Hassan et al. ............... | 370/332 |
| 8,599,803 B1* | 12/2013 | Zhang et al. ................ | 370/338 |
| 2001/0048694 A1* | 12/2001 | Banister ..................... | 370/537 |
| 2005/0152358 A1 | 7/2005 | Giesberts et al. | |
| 2006/0222005 A1* | 10/2006 | Gorshe et al. .............. | 370/466 |
| 2008/0080437 A1* | 4/2008 | Krishnaswamy et al. .... | 370/338 |
| 2009/0316637 A1* | 12/2009 | Yi et al. ..................... | 370/329 |
| 2010/0014463 A1* | 1/2010 | Nagai et al. ................. | 370/328 |
| 2010/0016023 A1* | 1/2010 | Yamauchi et al. .......... | 455/562.1 |
| 2010/0067379 A1* | 3/2010 | Zhao et al. .................. | 370/235 |
| 2010/0177755 A1* | 7/2010 | Chu et al. ................... | 370/338 |
| 2010/0183087 A1* | 7/2010 | Hosokawa et al. .......... | 375/262 |
| 2010/0260114 A1* | 10/2010 | Vermani et al. ............. | 370/329 |
| 2011/0019557 A1* | 1/2011 | Hassan et al. ............... | 370/252 |
| 2011/0026623 A1* | 2/2011 | Srinivasa et al. ............ | 375/260 |
| 2011/0128846 A1* | 6/2011 | Hong et al. ................. | 370/230 |
| 2011/0128900 A1* | 6/2011 | Seok .......................... | 370/311 |
| 2011/0134816 A1* | 6/2011 | Liu et al. .................... | 370/310 |
| 2011/0149822 A1* | 6/2011 | Sammour et al. ........... | 370/311 |
| 2011/0188424 A1* | 8/2011 | Ramamurthy et al. ...... | 370/311 |
| 2011/0267959 A1* | 11/2011 | Yi et al. ...................... | 370/241 |
| 2011/0310834 A1* | 12/2011 | Seok .......................... | 370/329 |
| 2012/0014335 A1* | 1/2012 | Adachi et al. ............... | 370/329 |
| 2014/0036895 A1* | 2/2014 | Liu et al. .................... | 370/338 |

OTHER PUBLICATIONS

International Preliminary Report on Patentability and Written Opinion dated Sep. 18, 2012 for corresponding International Application No. PCT/FR2011/050457, filed on Mar. 4, 2011.

French Search Report and Written Opinion dated Nov. 23, 2010 for corresponding French Application No. 1051670, filed on Mar. 8, 2010.

"Part 11: Wireless LAN Medium Access Control (MAC) and Physical Layer (PHY) Specifications", IEEE Standard for Information Technology—Telecommunications and Information Exchange Between Systems—Local and Metropolitan Area Networks—Specific Requirements, IEEE Computer Society, IEEE Std 802.11—2007, New York, Jun. 12, 2007, pp. 1-1232.

* cited by examiner

METHODS FOR TRANSMITTING AND RECEIVING DATA USING A PLURALITY OF RADIO CHANNELS, TRANSMISSION AND DESTINATION DEVICES, CORRESPONDING SIGNAL AND COMPUTER PROGRAM

CROSS-REFERENCE TO RELATED APPLICATIONS

This application is a Section 371 National Stage Application of International Application No. PCT/FR2011/050457, filed Mar. 4, 2011, which is incorporated by reference in its entirety and published as WO 2011/110779 on Sep. 15, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of communications on radiofrequency channels.

The disclosure pertains to the transmission of data packets in frequency bands situated around 2.4 GHz or 5 GHz, namely bands in which there operate especially devices according to the IEEE 802.11 standard or its revised versions, also called WiFi standards. In particular, the disclosure pertains to the transmission of data packets according to the IEEE 802.11n standard and its future versions, and especially the 802.11ac and 802.11ad versions.

The term "device" is understood to mean an element belonging to a basic service set (BSS) formed by an access point (AP) and the stations associated with this access point, i.e. the stations situated in the coverage zone of this access point.

BACKGROUND OF THE DISCLOSURE

The WiFi standard strives to define the low layers of the OSI (Open Systems Interconnection) model. These layers include a physical layer called PHY and two sub-layers relating to the data link layer of OSI model:
 a Logic Link Control or LLC layer, and
 a Media Access Control or MAC layer.

According to the 802.11n version of the WiFi standard, it is possible to aggregate several data packets at the MAC layer level in grouping together certain pieces of information associated with these data packets. The transmission of grouped information thus increases the efficiency of transfer of the payload information. This aggregating mechanism is illustrated, for example, in FIGS. 1B and 1C as compared with transmission without aggregation of data packets illustrated in FIG. 1A.

Thus, if no aggregating mechanism is implemented, the pieces of data are exchanged between the different devices of the BSS as follows:
 acquisition of the channel 111;
 transmission of a frame formed by a first PHY header referenced H_PHY 121, and a first data packet MPDU1 (MAC protocol data unit) comprising:
  a MAC header referenced H_MAC 131;
  a MAC service data unit referenced MSDU 141;
  a frame check sequence or frame integrity check sequence referenced FCS 151;
 acquisition of the channel 112;
 transmission of a frame formed by a second PHY header, referenced H_PHY 122, and a second data packet MPDU2 comprising:
  a MAC header referenced H_MAC 132;
  a MAC service data unit referenced MSDU 142;
  a frame check sequence referenced FCS 152;
 etc.

If the transmission implements an A-MSDU (aggregated MAC service data unit) type of aggregation as illustrated in FIG. 1B, the data packets coming from the level 3 layer of the OSI module are aggregated in a single MPDU data packet. The pieces of data are therefore exchanged between the different devices of the BSS as follows:
 acquisition of the channel 11;
 transmission of a frame formed by a PHY header, referenced H_PHY 12, and an MPDU data packet comprising:
  a MAC header referenced H_MAC 13;
  two MAC service data units referenced MSDU 141 and 142;
  a frame check sequence referenced FCS 15.

If the transmission implements an A-MPDU (aggregated MAC protocol data unit) type aggregation as illustrated in FIG. 1C, one and the same PHY header is used to transmit several data packets addressed to one and the same piece of equipment:
 acquisition of the channel 11;
 transmission of a frame formed by a PHY header referenced H_PHY 12, and an A-MPDU aggregated packet formed by two data packets MPDU1 and MPDU2 each comprising:
  a MAC header referenced H_MAC 131, and H_MAC 132 respectively;
  a MAC service data unit referenced MSDU 141, and MSDU 142 respectively;
  a frame integrity check sequence referenced FCS 151, and FCS 152 respectively.

The aggregation makes it possible to pool the acquisition of the channel, the PHY header or the MAC header or again to make different combinations.

In particular, the A-MPDU type aggregation makes it possible to pool the information of the PHY layer (H_PHY header 12 of FIG. 1C) while individualizing the integrity check of each data packet (FCS 151 and FCS 152 of FIG. 1C). Each data packet (MPDU1, MPDU2) therefore comprises its own MAC header (H_MAC 131, H_MAC 132) and its own frame integrity check (FCS 151, FCS 152).

This pooling of the PHY header and this differentiation of the MPDU data packets offers an efficient compromise. Indeed, if the transmission channel changes greatly from what can be determined through the PHY header, then only the last MPDU data packets will be lost because of divergence between the estimated and real coefficients of the channel. And although the 802.11 channel shows relatively slow variations, there is a risk that this situation will occur all the more frequently as the size of the frames carrying the A-MPDU aggregated packets is great.

The gains in throughput rate obtained through this A-MPDU type aggregation technique however amply warrant its use.

Besides, since the MAC throughput rate requirements are increasingly high, the frequency band used for the transmissions in a WiFi network have been increased, in concatenating several radiofrequency channels at the level of the PHY layer.

Thus, the 802.11a, b, g WiFi standards propose the use of a 20 MHz frequency band while the 802.11n WiFi standard proposes the use of a 40 MHz frequency band (where 40 MHz frequency band corresponds to a concatenation of two 20 MHz radiofrequency channels without overlapping). The standards currently being standardized propose the concatenation of up to four 20 MHz or 40 MHz channels (which may be adjacent or disjoint) to enable a transmission of data on an even wider band, for example 80 MHz.

FIG. 2 presents an example of transmission of data on a concatenated channel formed by a primary channel 21 and a secondary channel 22 according to the 802.11n standard.

To ensure transmission on a plurality of channels, the CSMA-CA (carrier sense multiple access-collision avoidance) access mode as described in the 802.11-2007 standard, paragraph 9.1 "MAC architecture", 9.1.1 "DCF", is implemented on the primary channel 21. This CSMA-CA mechanism provides for a sharing of access to a radiofrequency channel according to a principle known as that of contention: each device must listen to see if the channel is free (i.e. that no signal is being sent/received in this channel) for a variable duration corresponding to an AIFS (arbitrary inter-frame space) duration and a random waiting period (denoted as B for backoff) before transmitting data. This listening phase (based on a physical layer mechanism called CCA or clear channel assessment) gives access to the primary channel (acquisition of the channel 211) and is therefore implemented solely on the primary channel 21.

On the secondary channel 22, a verification is made only of non-occupancy for a specific duration known as PIFS (PCF inter-frame spacing), varying between 25 and 36 microseconds according to the IEEE 802.11n standard, using especially the CCA mechanism. The secondary channel 22 is pre-empted after the PIFS duration (if no exchange is detected during this period), implying that a device that needs a primary channel 21 and secondary channel 22 in order to send on a broader frequency band will obtain priority access to the secondary channel 22 if the primary channel 21 is free (because the PIFS duration is smaller than the duration of acquisition of the primary channel 21).

Data packets can thus be transmitted on a broader frequency band corresponding to the concatenation of the primary channel 21 and secondary channel 22 (at the PHY layer).

This technique of concatenation of the channels, which considerably increases the available band, makes it possible to obtain very high transmission throughput rates, especially when it is combined with a A-MPDU-type aggregation implemented at the MAC layer level.

FIG. 3 provides a more precise illustration of this A-MPDU type aggregation mechanism implemented on a concatenated channel C formed by four radiofrequency channels, each having a 20 MHz bandwidth and denoted as a primary channel 31, a secondary channel 32, a tertiary channel 33 and a quaternary channel 34. As described here above with reference to FIG. 2, the acquisition of the channel is implemented solely on the primary channel 31 when several channels are concatenated. The other channels 32, 33 and 34 are pre-empted.

The data packets MPDU1 to MPDU5 of FIG. 3, each comprise a MAC header (referenced H_MAC), a MAC service data unit (referenced MSDU1 to MSDU5), and a frame integrity check sequence (denoted as FCS) forming an A-MPDU aggregated packet. These data packets MPDU1 to MPDU5 are spread over all the radiofrequency channels of the concatenated channel C.

As already described, a same header PHY is used to transmit several data packets addressed to a same device. The PHY header (referenced H_PHY) is therefore duplicated on the different radiofrequency channels 31 to 34, and sent synchronously. There is therefore no spreading of this information. In this way, the devices using the non-primary channels can know the length of the frame without needing to consider all the radiofrequency channels. Reception can be done correctly only if the PHY header has truly been received.

The frame formed by the headers H_PHY and the A-MPDU aggregated packet is then sent on the concatenated channel C.

In addition to giving very high transmission throughput rates, the concatenation of the radiofrequency channels combined with the implementation of an A-MPDU type aggregation limits transmission errors. Indeed, as illustrated in FIG. 3, the data packets spread over all the radiofrequency channels of the concatenated channel C last for a shorter time (in terms of transmission time) and are therefore more resistant to the variations of the channel.

Unfortunately, the concatenation of radiofrequency channels also has drawbacks.

Indeed, the probability of having a collision of data packets after a successful contention phase depends not only on the number of stations of the basic service set (BSS) but also on the traffic and the distance between an access point and the stations that are associated with it. This probability of collision is not negligible when a plurality of radiofrequency channels is used. Indeed, it is possible that a device of the BSS sending in only one radiofrequency channel (a main channel or another channel) will obtain a backoff period B that finishes at the same time as the backoff period allocated to a device sending in several radiofrequency channels. The two devices will then consider the radiofrequency channel to be free and send data simultaneously, and this will lead to a collision of the data packets. This is a flaw in the CSMA/CA mechanism.

The problem of the concealed stations is also responsible for numerous collisions. It may be recalled that, by definition, all the stations are within range of the access point (AP) which federates the BSS. On the contrary, not all the stations are necessarily within range of one another. It may therefore happen that a station transmits data to the AP (while perfectly complying with all the imposed mechanisms) while another station, which is outside its range, is already transmitting data to the AP. The AP therefore loses data coming from both stations because of jamming induced by the first station, which in this case is called a "concealed" station.

Furthermore, when the band used is extended, the probability of collision (after successful acquisition of the desired channels) is doubled, tripled or even quadrupled depending on the number of radiofrequency channels over which the frame extends. There is therefore a high risk of collision.

Besides, even in using an A-MPDU type aggregation mechanism, a single collision on one of the radiofrequency channels can lead to the loss of the entire frame since all the headers will be corrupted. If the effect of the collision is far too great to be corrected by the mechanisms of the PHY layer, the data packets will be wrongly demodulated and the integrity check will give a negative result. It therefore becomes necessary to retransmit the data packets, and this consumes bandwidth and reduces the efficiency of the system.

There is therefore a need for a novel technique of transmission on multiple channels using a mechanism of aggregation of the data packets, enabling the risk of collision to be limited.

SUMMARY an embodiment of the invention relates to a method for transmitting data packets in a communications network using a plurality of radiofrequency channels, said communications network being organized into a plurality of communications layers comprising a data link layer, called a MAC layer, and a physical layer, called a PHY layer. Such a method implements, at the MAC layer, a step for aggregating data packets to be transmitted to a same destination, delivering at least two aggregated packets, with which there is associated a single header of the PHY layer. Furthermore, at least two of the radiofrequency channels are concatenated to form one concatenated channel.

According to an embodiment of the invention, such a method implements a step for simultaneously sending said at least two aggregated packets respectively on at least two distinct concatenated sub-channels, a concatenated sub-channel being formed by at least one of the radiofrequency channels of the concatenated channel.

An embodiment of the invention thus proposes a novel and inventive approach to the transmission of aggregated packets on a wider frequency band, corresponding to the concatenation of several radiofrequency channels (multichannel transmission). For example, a concatenated channel is formed by four 20 MHz radiofrequency channels, thus enabling transmission on an 80 MHz band.

According to an embodiment of the invention, each aggregated packet is transmitted in a distinct concatenated sub-channel. Thus, the data packets forming an aggregated packet are not spread on all the radiofrequency channels, forming a concatenated channel, but on only a subset of radiofrequency channels, called a concatenated sub-channel. In other words, an embodiment of the invention proposes to:

modify the aggregation at the MAC layer in taking account of a parameter N corresponding to the number of concatenated sub-channels in order to provide N aggregated packets instead of a single aggregated packet, modify the PHY layer in order to transmit these N aggregated packets simultaneously on the entire available frequency band (corresponding to the concatenated channel).

In spreading the aggregation on a subset of radiofrequency channels of the concatenated channel, this technique reduces the impact of a collision and thus increases the efficiency of a PHY-MAC transfer.

Indeed if, instead of having data packets spread on all the radiofrequency channels of the concatenated channel (for example, five data packets spread on all the radiofrequency channels of the concatenated channel as illustrated in FIG. 3), these data packets are spread on at least two subsets of radiofrequency channels (for example two data packets are spread on a first concatenated sub-channel, two other data packets are spread on a second concatenated sub-channel, another data packet is spread on a third concatenated sub-channel, etc.), the aggregated packets obtained after aggregation of these data packets are closed off from these concatenated sub-channels, and the number of collision-related retransmissions is therefore diminished.

Furthermore, the use of concatenated sub-channels makes it possible, at the level of the PHY layer, to obtain a parallelization of the processing of the signal.

In particular, an embodiment of the invention concerns A-MPDU type aggregations. Therefore, zero, one or more MPDU data packets are aggregated to form an A-MPDU aggregated packet.

According to one particular aspect, the single header of the PHY layer is transmitted synchronously on each of the radiofrequency channels forming the concatenated channel, prior to the step for sending.

Thus, a same PHY header is used to transmit several data packets addressed to a same device. The PHY header is therefore duplicated on all the radiofrequency channels forming the concatenated channel, and sent synchronously.

According to one particular embodiment, the method for transmitting comprises a step of signaling the simultaneous sending of the aggregated packets on the concatenated sub-channels.

This signaling enables the insertion of a new indicator in a signaling field or the modification of an existing signaling field, to inform a destination device of a transmission on concatenated sub-channels. In this way, the destination device knows which concatenated sub-channels it must listen to in order to accurately decode the information transmitted. An indicator of this kind can be inserted/modified in the header of the PHY layer, or again inserted in a beacon sent by a device (access point) of a basic service set or BSS.

In particular, the step for signaling signals at least one of the following pieces of information:

number of concatenated sub-channels in the concatenated channel (corresponding to the number of aggregated packets to be transmitted on the concatenated channel);

radiofrequency channels each forming concatenated sub-channels;

number of radiofrequency channels occupied by each aggregated packet;

type of aggregation implemented (classic aggregation also called "vertical" aggregation or aggregation according to an embodiment of the invention, also called "horizontal" aggregation).

It is thus possible to insert one or more indicators or modify one or more existing indicators.

According to one particular characteristic of an embodiment of the invention, the method for transmitting comprises a step for inserting a padding sequence after the last data packet of at least one aggregated packet (or after a packet-end delimiter of at least one aggregated packet) so that each aggregated packet sent during the step for sending has an identical length.

In this way, each concatenated sub-channel sends a sequence of a same length and all the radiofrequency channels of the concatenated channel are released at the same time for another transmission.

In particular, the length of an A-MPDU aggregated packet can be encoded in a field of the PHY header (LENGTH field in bytes). By default, this field is assigned the value of the greatest aggregated packet (i.e. the packet associated with the largest number of modulated symbols).

According to one particular embodiment of the invention, the method for transmitting comprises a step for sub-dividing a data packet into at least two new data packets known as fragmented packets. The aggregation step then distributes the fragmented packets into at least two distinct aggregated packets.

These fragmented packets each comprise a MAC header, a MAC service data unit, and a frame integrity check sequence or FCS.

In this way, a part of the original data packet is transmitted on a first concatenated sub-channel and at least one other part of the original data packet is transmitted on another concatenated sub-channel.

This "fragmentation" of the data packets thus facilitates the arrangement of the information to be transmitted. In particular, it can be implemented to obtain aggregated packets of identical length while restricting the size of the padding sequences introduced into the other aggregated packets. This fragmentation therefore limits the transmission of non-payload information such as the padding sequences. Furthermore, the fragmented packets can be resent independently in the event of collision, since each of them has a MAC header and a frame check sequence.

In another embodiment, the invention pertains to a device for transmitting data packets in a communications network as defined here above. Such a device comprises means for aggregating data packets to be transmitted to a same destination, implemented at the MAC layer level, delivering at least two aggregated packets with which a single header of the PHY layer is associated.

According to an embodiment of the invention, such a device for transmitting also comprises means for the simultaneous sending of said at least two aggregated packets respectively on at least two distinct concatenated sub-channels, a concatenated sub-channel being formed by at least one of the radiofrequency channels of the concatenated channel.

A device of this kind is especially suited to implementing the method for transmitting described here above. It is for example an access point or a station of a basic service set in the case of a WiFi network.

This device could of course comprise the different characteristics relative to the method for transmitting according to an embodiment of the invention. Thus, the characteristics and advantages of this device are the same as those of the method for transmitting and are not described in greater detail.

In particular, the sending means of such a device comprise a set of transmission modules specific to each concatenated sub-channel, a set comprising at least the following modules: scrambler, channel encoder, interlacer, binary symbol encoder, MIMO (multiple input multiple output) signal processing module, OFDM (orthogonal frequency division multiplexing) modulator.

Indeed, as indicated here above, the use of concatenated sub-channels makes it possible, at the PHY layer, to parallelize the processing of the signal.

According to one particular embodiment, at least one of the modules is used for at least two distinct concatenated sub-channels. In other words, certain modules of the sending chain, which are common to the different concatenated sub-channels, are pooled. These are for example: the symbol binary encoder, the MIMO signal processing module, or again the OFDM modulator.

An embodiment of the invention also pertains to a multi-carrier signal sent in a communications network using a plurality of radiofrequency channels as described here above.

According to an embodiment of the invention, the signal carries:
data associated with an aggregated packet, on carriers belonging to a first concatenated sub-channel, and
data associated with at least one distinct aggregated packet, on carriers belonging to at least one second concatenated sub-channel;
a concatenated sub-channel being formed by at least one of the radiofrequency channels of the concatenated channel, and the aggregated packets with which a single header of the PHY layer is associated, resulting from an aggregation of data packets to be transmitted towards a same destination, implemented at the level of the MAC layer before sending.

Such a multicarrier signal can be generated according to the method for transmitting described here above. It could of course comprise the different characteristics pertaining to the above-described method for transmitting.

For example, such a signal comprises a signaling field, in the PHY header, carrying at least one indicator of a simultaneous sending of the aggregated packets respectively on at least two distinct concatenated sub-channels.

For example, such an indicator belongs to the group comprising:
number of concatenated sub-channels in the concatenated channel (corresponding to the number of aggregated packets to be transmitted on the concatenated channel);
radiofrequency channels each forming concatenated sub-channels;
number of radiofrequency channels occupied by each aggregated packet;
type of aggregation implemented (classic aggregation also called "vertical" aggregation or aggregation according to an embodiment of the invention, also called "horizontal" aggregation).

According to one variant, this indicator or these indicators are present in a beacon sent by a device (access point) of the BSS.

An embodiment of the invention also pertains to a method for receiving aggregated packets in a communications network using a plurality of radiofrequency channels as described here above.

According to an embodiment of the invention, such a method implements the following steps:
receiving at least two aggregated packets respectively on at least two distinct concatenated sub-channels, a concatenated sub-channel being formed by at least one of the radiofrequency channels of the concatenated channel,
the aggregated packets with which there is associated a single header of the PHY layer, resulting from an aggregation of data packets to be transmitted to a same destination, implemented at the level of the MAC layer before sending,
for at least one aggregated packet, extracting the data packet or packets forming the aggregated packet.

Thus, the method for receiving according to an embodiment of the invention relies on a novel and inventive approach to the processing of aggregated packets, when these aggregated packets are sent on distinct concatenated sub-channels.

Such a method for receiving is therefore capable of decoding aggregated packets transmitted according to the method for transmitting described here above.

In particular, such a method implements a step for eliminating (at the MAC level) at least one padding sequence inserted after the last data packet of at least one aggregated packet, preliminarily to the step for extracting (and interpreting) the data packet or packets.

According to one variant, the method for receiving implements a rebuilding of a data packet from several fragmented packets present in distinct aggregated packets.

In another embodiment, the invention pertains to a destination device for receiving aggregated packets in a communications network using a plurality of radiofrequency channels as described here above.

Such a device comprises:
means for receiving at least two aggregated packets respectively on at least two distinct concatenated sub-channels, a concatenated sub-channel being formed by at least one of the radiofrequency channels of the concatenated channel, the aggregated packets with which there is associated a single header of the PHY layer, resulting from an aggregation of data packets to be transmitted to a same destination, implemented at the level of the MAC layer before sending, for at least one aggregated packet, extracting and interpreting the data packet or packets forming the aggregated packet.

A device of this kind is especially suited to implementing the method for receiving described here above. It is for example an access point or a station of a basic service set in the case of a WiFi network.

This device could of course comprise the different characteristics relative to the method for receiving according to an embodiment of the invention. Thus, the characteristics and advantages of this device are the same as those of the method for receiving and are not described in greater detail.

In particular, the means for receiving of such a device comprise a set of reception modules specific to each concatenated sub-channel, a set comprising at least the following modules: descrambler, channel decoder, de-interlacer, equalizer, binary symbol detector, MIMO detector, OFDM demodulator.

Indeed, as indicated here above, the use of concatenated sub-channels makes it possible, at the PHY layer, to parallelize the processing of the signal.

According to one particular embodiment, at least one of the modules is used for at least two distinct concatenated sub-channels. In other words, certain modules of the receiving chain, which are common to the different concatenated sub-channels, are pooled. These are for example: the equalizer, the symbol binary detector, the MIMO detector, the OFDM demodulator.

Another aspect of an embodiment of the invention pertains to a computer program comprising instructions suited to implementing the method for transmitting and/or the method for receiving described here above, when the program is executed by a processor. Such a program may use any programming language whatsoever. It can be downloaded from a communications network and/or recorded on a computer-readable medium.

BRIEF DESCRIPTION OF THE DRAWINGS

Other features and advantages shall appear more clearly from the following description of a particular embodiment, given by way of a simple illustrative and non-exhaustive example, and from the appended drawings, of which.

DETAILED DESCRIPTION OF ILLUSTRATIVE EMBODIMENTS

1. General Principle

The general principle of an embodiment of the invention relies on a specific aggregation of the data packets enabling the data to be spread on only one part of the radiofrequency channels forming the concatenated channel. In this way, the data packets are grouped together so that different aggregated packets are sent simultaneously on several concatenated sub-channels, each aggregated packet being sent in a distinct concatenated sub-channel.

The term "concatenated channel" is understood here to mean a channel corresponding to the concatenation of several radiofrequency channels, used for a multichannel transmission. Such a concatenated channel defines a band for the transmission of data that is wider than a single radiofrequency channel. The term "concatenated sub-channel" is understood to mean a single radiofrequency channel of the concatenated channel or a set of radiofrequency channels of the concatenated channel. It may be recalled that these radiofrequency channels are not necessarily adjacent.

This grouping of data packets makes it possible to "close off" or "partition off" the different concatenated sub-channels (one aggregated packet per concatenated sub-channel), enabling a reduction of the impact of a collision of packets. Indeed, according to an embodiment of the invention, a collision occurring on one radiofrequency channel of the concatenated channel no longer affects all the aggregated packets of the concatenated channel but only the aggregated packet sent in the concatenated sub-channel comprising this radiofrequency channel. It is therefore possible to diminish the quantity of data packets to be retransmitted in the event of collision, in retransmitting only the data packets (MPDU) that are not received, thus releasing the radiofrequency channels more swiftly.

2. Transmission: Main Steps and Examples of Implementation

Figure 4:
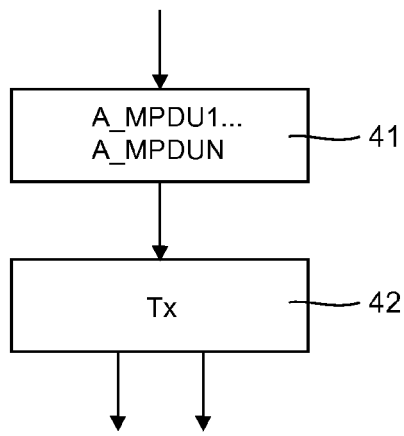
FIG. 4 presents the main steps of the method for transmitting according to a particular embodiment of the invention.

FIG. 4 illustrates the main steps implemented by the technique for transmitting data packets according to one embodiment of the invention.

To this end, we consider a communications network using a plurality of radiofrequency channels, at least two of the radiofrequency channels being concatenated to form a concatenated channel. This network is organized into a plurality of communications layers comprising a data link layer, called a MAC layer, and a physical layer, called a PHY layer.

More specifically, this data packet transmission technique implements the following steps:

aggregation (41) of data packets to be transmitted to a same destination, delivering at least two aggregated packets with which there is associated a single header of the PHY layer, at the level of the MAC layer;

simultaneous sending (42) of said at least two aggregated packets respectively on at least two distinct concatenated sub-channels, at the level of the PHY layer.

These different steps can be implemented in various ways, especially in hardware form or in software form.

Figure 5:
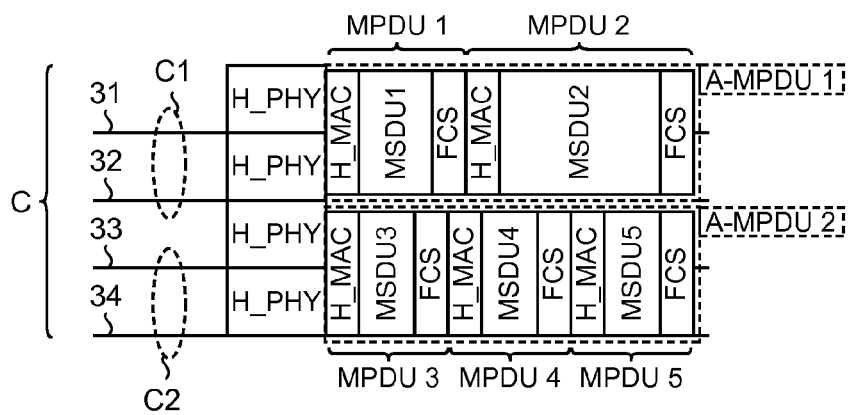
FIGS. 5 to 7 illustrate examples of multichannel transmission according to an embodiment of the invention.

FIG. 5 illustrates the implementing of this technique for a multichannel transmission according to the 802.11n standard, implementing four radiofrequency channels at the PHY layer and a A-MPDU type aggregation at the level of the MAC layer. Here, we return to the configuration of multichannel transmission illustrated in FIG. 3 with reference to the prior art.

This example therefore considers a concatenated channel C formed by a primary channel 31, a secondary channel 32, a tertiary channel 33 and a quaternary channel 34. The acquisition of the channel is done on the primary channel 31. The other channels 32, 33 and 34 are pre-empted.

We also consider five data packets MPDU1 to MPDU5. Each data packet is formed by a MAC header (referenced H_MAC), a MAC service data unit (referenced MSDU1 to MSDU5) and a frame integrity check sequence or frame check sequence (denoted as FCS).

According to this example, two aggregated packets (41) are formed: a first aggregated packet referenced A-MPDU1 formed by the data packets MPDU1 and MPDU2, and a second aggregated data packet referenced A-MPDU2 formed by the data packets MPDU3, MPDU4 and MPDU5.

Each aggregated packet is associated with a distinct concatenated sub-channel over which the data packets of the aggregated packet are spread. Thus, the first aggregated packet A-MPDU1 is associated with a first concatenated sub-channel C1 comprising the primary radiofrequency channel 31 and secondary radiofrequency channel 32 and the second aggregated packet A-MPDU2 is associated with the second concatenated sub-channel C2 comprising the tertiary radiofrequency channel 33 and quaternary radiofrequency channel 34.

The first and second aggregated packets A-MPDU1 and A-MPDU2 are then sent simultaneously (42) on the concatenated sub-channel associated with them: the first aggregated packet A-MPDU1 is sent on the first concatenated sub-channel C1 and the second aggregated packet A-MPDU2 is sent on the second concatenated sub-channel C2.

Furthermore, owing to the aggregation, the PHY header is pooled. In other words, a same header PHY is used to transmit several data packets addressed to a same device. This single header of the PHY layer is designed to be transmitted synchronously on each of the radiofrequency channels (31 to 34) of the concatenated channel C.

By using two distinct concatenated sub-channels C1 and C2 according to this embodiment of the invention, the probability of collision is divided by almost two. The proposed technique therefore enables a reduction in the risk of collision through the use of subsets of radiofrequency channels.

According to another example, it is possible that a concatenated sub-channel will comprise a single radiofrequency channel. In this case, an aggregated packet A-MPDU is sent on a single radiofrequency channel. In the same way, the number of radiofrequency channels in the different concatenated sub-channels of a concatenated channel is not necessarily identical. Thus, to send on a 60 MHz band, it is possible to consider a first concatenated sub-channel formed by two 20 MHz radiofrequency channels and a second concatenated sub-channel formed by one 20 MHz radiofrequency channel.

Figure 6:
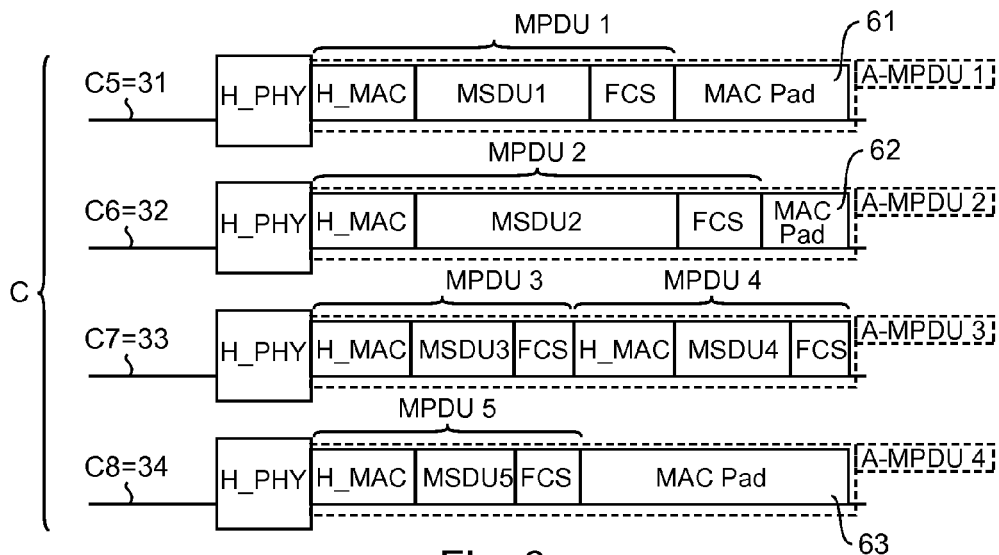
Figure 7:
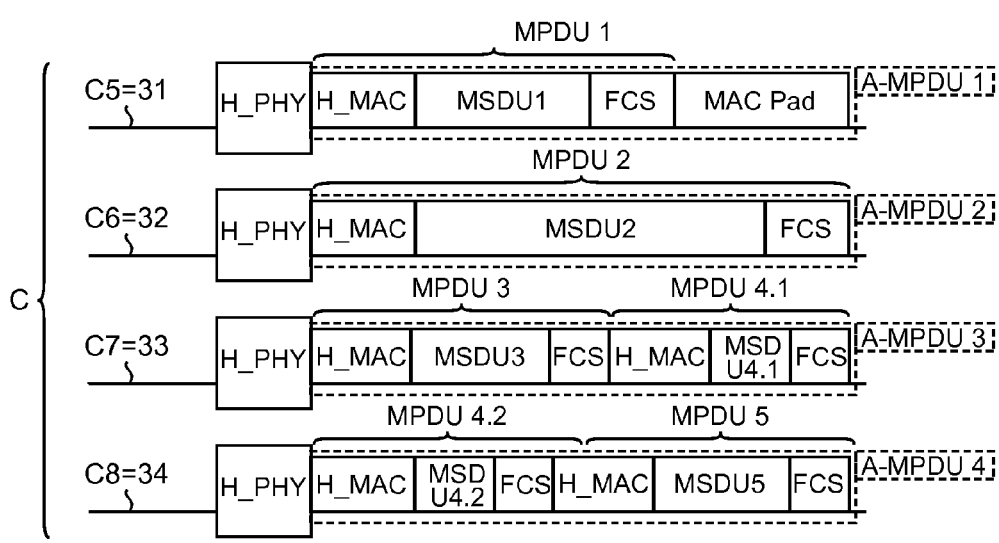

FIGS. 6 and 7 illustrate the case where each concatenated sub-channel (C5, C6, C7, C8) comprises a single radiofrequency channel (31, 32, 33, 34 respectively), in a multichannel transmission network according to the probable form of the future 802.11 ac standard, implementing four radiofrequency channels at the level of the PHY layer and an A-MPDU type aggregation at the MAC layer level, as described with reference to FIGS. 3 (prior art) and 5 (an embodiment of the invention).

More specifically, FIGS. 6 and 7 illustrate the case where the aggregated packets are modified so that all present the same length.

Indeed, since the data to be sent must preliminarily be put into queues and made ready to be dispatched as soon as access to the primary channel is acquired, there is no time available to re-sequence this data to try and find an optimal layout. Now, the current standards stipulate that there should be a same PHY header for all the radiofrequency channels of a concatenated channel. The length of the frames to be sent on each concatenated sub-channel indicated in the PHY header is therefore the same for all the concatenated sub-channels. It can therefore be necessary to modify the aggregated packets so that they all have the length defined in the PHY header.

To this end, it is possible as illustrated in FIG. 6 to add a particular sequence as a padding sequence denoted MAC Pad after the FCS field of the last data packet of an aggregated packet.

Thus, a MAC Pad sequence 61 has been added following the data packet MPDU1, a MAC Pad sequence 62 has been added following the data packet MPDU2, and a MAC Pad sequence 63 has been added following the data packet MPDU5. In this way, the aggregated packets A-MPDU1 (formed by the data packet MPDU1 and the MAC Pad sequence 61), A-MPDU2 (formed by the data packet MPDU2 and the MAC Pad sequence 62), A-MPDU3 (formed by the data packet MPDU3 and MPDU4), and A-MPDU4 (formed by the data packet MPDU5 and MAC Pad sequence 63) all have identical length.

This first solution, although costly in terms of resources owing to the use of padding sequences, can easily be implemented when a particular sequence easily recognizable at the MAC level is inserted.

It is also possible, as illustrated in FIG. 7, to subdivide a data packet into at least two new data packets known as fragmented packets and to redistribute the fragmented packets among at least two distinct aggregated packets. For example, the data packet MPDU4 can be fragmented into two fragmented packets referenced MPDU4.1 and MPDU4.2. In this way, the aggregated packets A-MPDU1 (formed by the data packet MPDU1 and a MAC Pad sequence), A-MPDU2 (formed by the data packet MPDU2), A-MPDU3 (formed by the data packet MPDU3 and the fragmented packet MPDU4.1), and A-MPDU4 (formed by the fragmented packet MPDU4.2 and the data packet MPDU5) all have identical length.

This fragmentation facilitates the arrangement of the aggregated packets.

It is noted that, inasmuch as these fragmented packets can be sent back independently, as needed, since each of them comprises a MAC header, a MAC service data unit and an FCS integrity check sequence, this organization can be advantageous. It is noted that this fragmentation of a data packet MPDU4 into two fragmented packet MPDU4.1 and MPDU 4.2 requires the generation of an additional MAC header and an additional integrity check sequence, which entails a loss of throughput rate (or overhead) in transmission. However, if an error occurs on either of these fragmented packets, it is easy to identify the corrupted fragmented packet through a cyclic redundancy check (or CRC) mechanism and resend only the aggregated packet comprising this fragmented packet (upon request by the receiver) or only the fragmented packet rather than all the aggregated packets, thus providing for an efficient compromise.

This technique also makes it possible to restrict the use of the padding sequence to generate aggregated packets of a same length, making it possible to restrict throughput rate losses.

It is noted that this second approach may be combined with the first approach as illustrated in FIG. 7 for the aggregated packet A-MPDU1.

It is observed in these different examples that the frames sent in a same concatenated channel C all have the same header PHY sent synchronously. The technique proposed therefore differs from the OFDMA multiple access technique enabling the transmission of data packets to distinct destination devices, and for which distinct carriers of the frequency band are used for each of the destination devices in informing each destination device of the carriers that concern it.

In figurative terms, the aggregation according to an embodiment of the invention may be considered to be a "horizontal" aggregation and not a "vertical" aggregation as proposed in the prior art.

3. Examples of Signaling

In order that a destination device of the network may receive and decode the frames sent in a concatenated channel, it can be informed of the sending of the different aggregated packets on distinct concatenated channels.

To this end, it is possible to insert one or more new indicators or modify existing indicators in the frames sent in the concatenated channel.

According to a first example, it is possible to insert or reuse a PHY header bit, and more specifically the PLCP (physical layer convergence procedure) header of a signaling field indicating that aggregated packets are sent respectively on distinct concatenated sub-channels or indicating that the processing operations are to be separated. A signaling field of this kind is for example the field VHT-SIG defined in the new 802.11ac and 802.11ad versions of the WiFi standard. It is also possible to add bits (for example 1, 2, 3 or 4 bits according to the bandwidth of the concatenated channel) to indicate the configuration used for closing off, i.e. to indicate the number of concatenated sub-channels (in encoding the parameter N for example).

According to a second example, it is possible to insert a bit into a beacon indicating the sending, in the basic service set BSS, of aggregated packets respectively on distinct concatenated sub-channels. It is also possible to add bits (for example 1, 2, 3 or 4 bits according to the bandwidth of the concatenated channel) to indicate the configuration used for the closing off, i.e. to indicate the number of concatenated sub-channels (in encoding the parameter N for example).

It is also possible that a destination device is directly designed to receive frames transmitted according to an embodiment of the invention, in which case it is not necessary to inform it of the sending of aggregated packets respectively on distinct concatenated sub-channels.

Figure 1A:
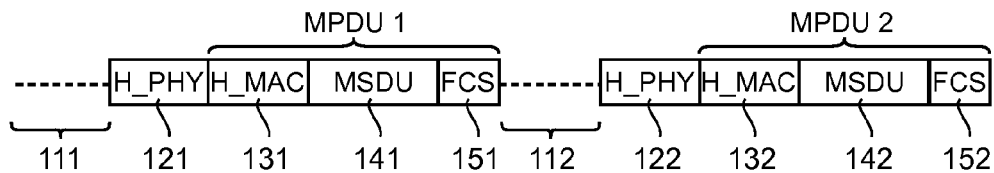
FIGS. 1A to 1C illustrate the methods of aggregation of the data packets according to the prior art.
Figure 1B:
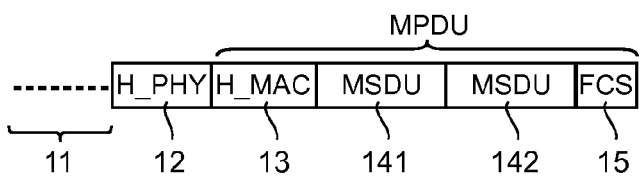
Figure 1C:
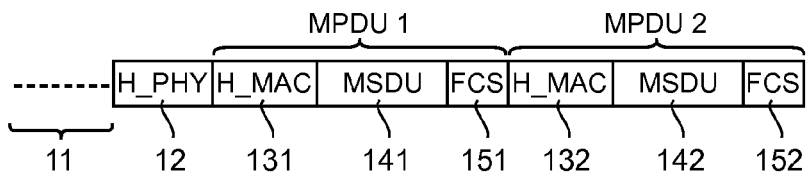
Figure 2:
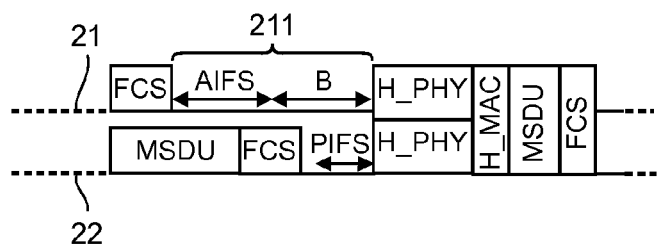
FIG. 2, also presented with reference to the prior art, presents an example of multichannel transmission according to the 802.11n standard.
Figure 3:
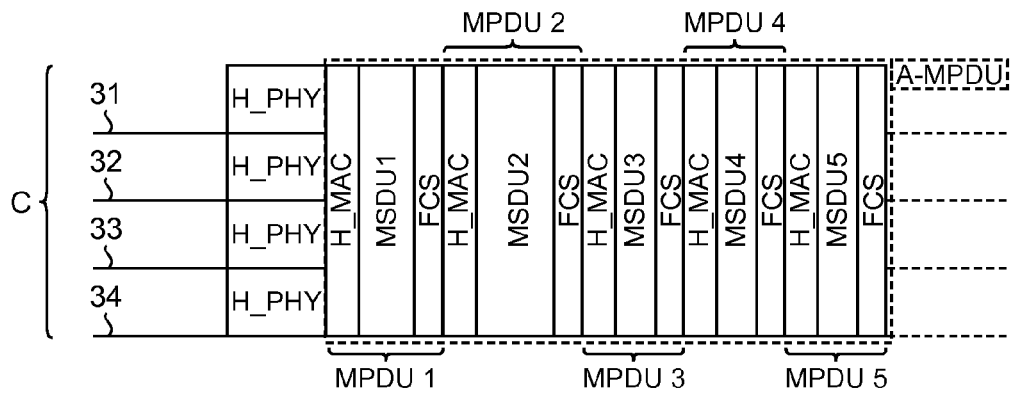
FIG. 3 illustrates an example of multichannel transmission of aggregated packets according to the prior art.

According to one variant, such a destination device, depending on the bandwidth, can know whether it must process the frames received in a classic way (when the aggregated packets have been spread over the entire concatenated channel as illustrated in FIG. 3), or whether it must adapt its processing (when the aggregated packets are sent on distinct concatenated sub-channels). Thus, a device of this kind works in the classic way ("vertical" aggregation) for certain bandwidths (for example the 20 MHz or 40 MHz bandwidths) and in a novel way ("horizontal" aggregation) for other bandwidths (for example 60 MHz, 80 MHz or greater bandwidths).

Preferably, the mapping of the used channels must also be indicated: thus, those radiofrequency channels that form the concatenated channel and/or those radiofrequency channels that form the concatenated sub-channels of the concatenated channel are indicated.

It is also desirable to signal the number of radiofrequency channels occupied by each aggregated packet (corresponding to "vertical" granularity). For example, referring to FIG. 5, each aggregated packet occupies two radiofrequency channels (the primary channel 31 and the secondary channel 32 for the aggregated packet A-MPDU1, the tertiary channel 33 and the quaternary channel 34 for the aggregated packet A-MPDU2). If we consider the radiofrequency channels, each having a 20 MHz bandwidth, it can be chosen to indicate the bandwidth occupied by each aggregated packet: 20 MHz, 40 MHz, etc.

It can be noted that, in the case of particular configurations, as in the case of a concatenated channel having a 60 MHz bandwidth, it is possible to spread certain aggregated packets over 40 MHz and others over the remaining 20 MHz. It is therefore preferable, for each aggregated packet, to indicate the number of radiofrequency channels that this aggregated packet occupies (in the PHY header or in a beacon).

4. Reception: Main Steps

Figure 8:
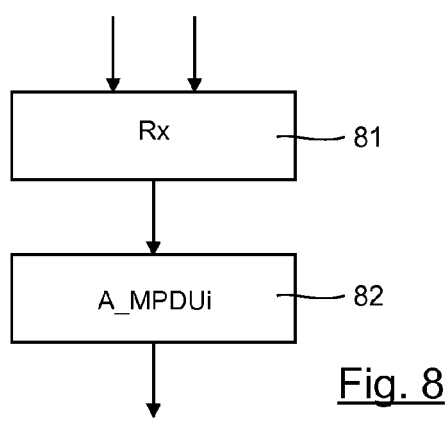
FIG. 8 presents the main steps of the method for receiving according to a particular embodiment of the invention.

Referring now to FIG. 8, the main steps implemented by the technique for receiving aggregated packets according to one embodiment of the invention are presented.

To this end, we consider a communications network as defined here above using a plurality of radiofrequency channels, at least two of the radiofrequency channels being concatenated to form a concatenated channel. This network is organized into a plurality of communications layers comprising a data link layer known as a MAC layer and a physical layer known as a PHY layer.

More specifically, this technique for receiving aggregated packets implements the following steps:

receiving (81) at least two aggregated packets respectively on at least two distinct concatenated sub-channels, a concatenated sub-channel being formed by at least one of the radiofrequency channels of the concatenated channel;

said aggregated packets, with which there is associated a single header of the PHY layer, resulting from an aggregation of data packets to be transmitted to a same intended destination, implemented at the level of the MAC layer before sending;

for at least one aggregated packet A-MPDUi, extracting (and interpreting) (82) the data packet or packets forming the aggregated packet.

These different steps can be implemented in various ways, especially in hardwired form or in software form.

They can be performed by a destination device, once this destination device has detected a simultaneous sending of aggregated packets on distinct concatenated sub-channels.

To this end, the method for receiving can implement a preliminary step for reading at least one indicator of simultaneous sending or parallel processing, as described here above. This indicator or indicators may be read in the PLCP header or in a beacon of received frames. According to one variant, the destination device systematically implements the steps for receiving (81) and extracting (82), whatever the bandwidth of the concatenated channel or it implements these steps only for a concatenated channel having a great bandwidth, for example greater than or equal to 60 MHz.

If one or more padding sequences has been introduced by the device for transmitting, as illustrated in FIG. 6, then it is possible to eliminate them from the MAC layer before extracting the data packets or packets.

Similarly, if one (or more) data packets has been subdivided into several fragmented packets transmitted on several distinct concatenated sub-channels after aggregation, as illustrated in FIG. 7, then it is necessary to decode the aggregated packets associated with all these distinct concatenated sub-channels to enable the rebuilding of the original data packet. For example, referring to FIG. 7 again, it is necessary to decode the aggregated packets A-MPDU3 and A-MPDU4 to be able to rebuild the original data packet MPDU4.

These steps for eliminating padding sequences or building data packets can be implemented at the MAC layer level upon reception of a specific indicator or automatically implemented following the detection, by the destination device, of a padding sequence or of fragmented packets.

5. Device for Transmitting and Destination Device

Figure 9:
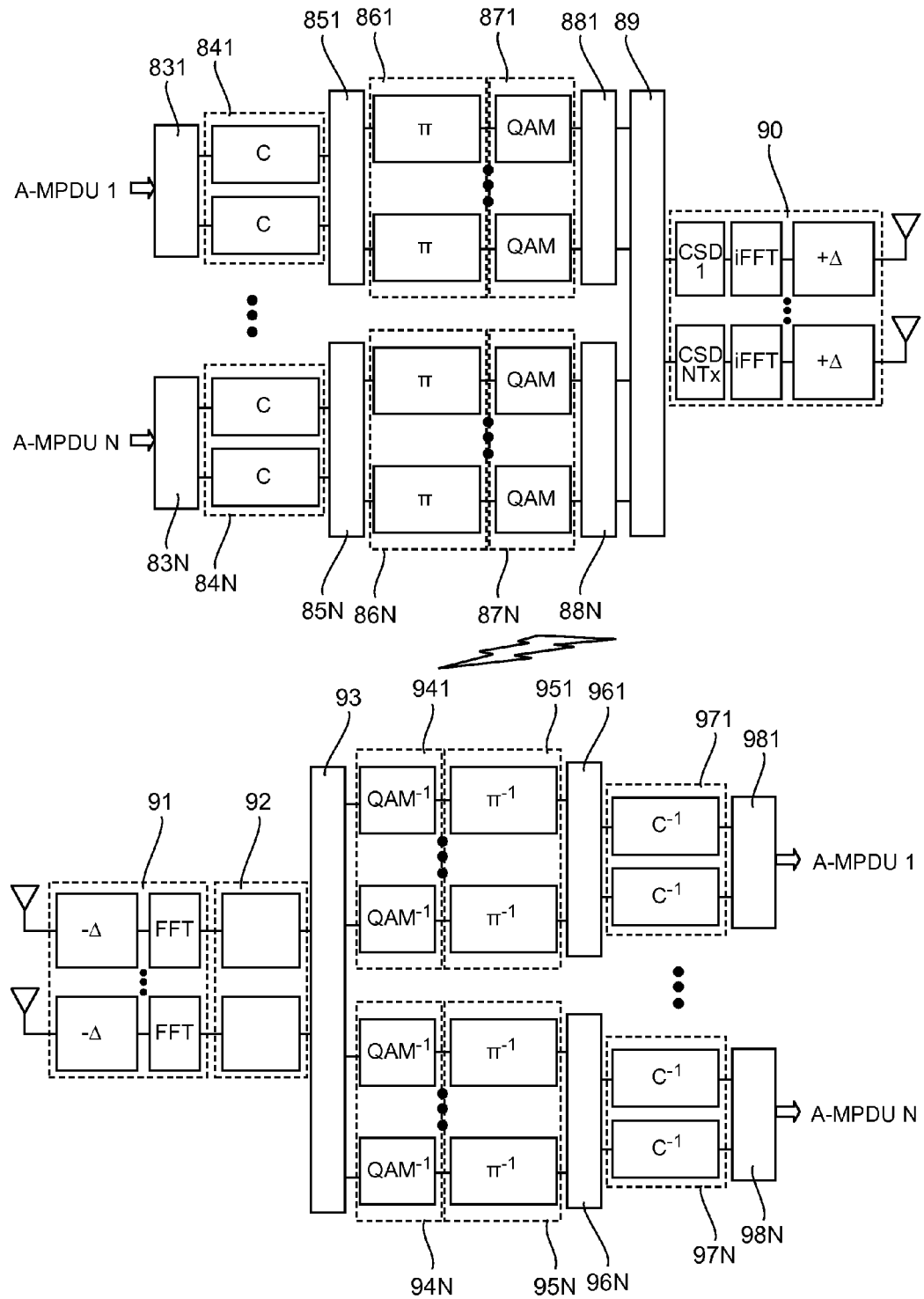
FIGS. 9 and 10 present two examples of transmission chains according to the invention.
Figure 10:
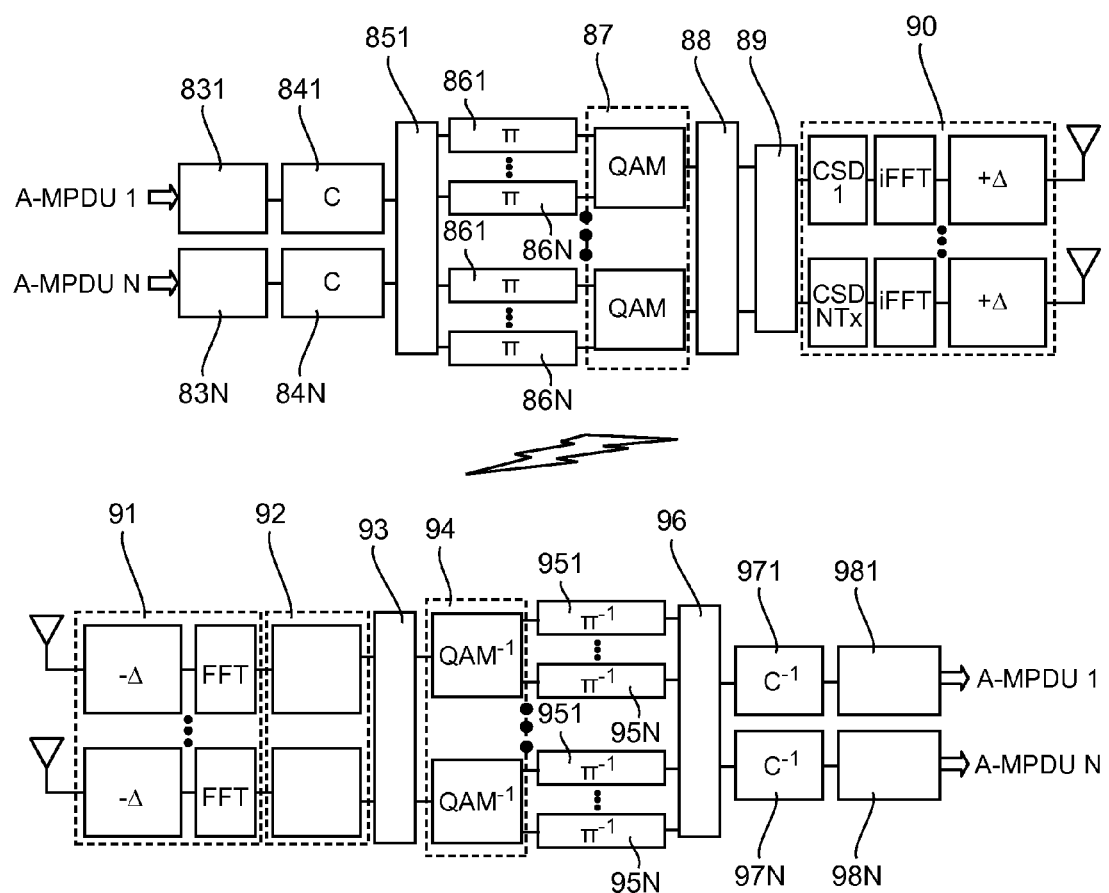

Referring now to FIGS. 9 and 10, we present the modifications of the PHY layer enabling the transmission of the N aggregated packets simultaneously on the entire frequency bandwidth available, each aggregated packet being transmitted in a distinct concatenated sub-channel.

It may be recalled indeed that an embodiment of the invention proposes to:
  modify the aggregation into MAC layer in taking account of a parameter N corresponding to the number of concatenated sub-channels, in order to provide N aggregated packets instead of a single aggregated packet, and
  modify the PHY layer in order to transmit these N aggregated packets simultaneously on the entire available frequency band (corresponding to the concatenated channel).

It may be recalled that, in a classic manner, the MAC layer delivers data packets to a PHY layer. The proposed parallelism of the aggregations at the level of the MAC layer (corresponding to the taking into account of the concatenated sub-channels) therefore also has repercussions at the level of the PHY layer.

Thus, a device for transmitting comprises means for aggregating data packets to be transmitted to a same destination, delivering at least two aggregated packets, implemented at the level of the MAC layer, and means for simultaneously sending said at least two aggregated packets respectively on at least two distinct concatenated sub-channels, implemented at the level of the PHY layer.

A destination device for its part comprises means for receiving at least two aggregated packets respectively on at least two distinct concatenated sub-channels, implemented at the level of the PHY layer and, for at least one aggregated packet, means for extracting (and interpreting) said data packet or packets forming the aggregated packet, implemented at the level of the MAC layer.

Owing to a transmission on several concatenated sub-channels, there is a parallelization of the processing of the signal. This corresponds, at the level of the PHY layer, to having a duplication of a part of the sending and receiving chains (scramblers/descramblers, encoders/decoders and interleaver/deinterleaver) making it possible to have independent and parallel processing operations.

In the context of a MIMO transmission implementing an OFDM modulation as illustrated in FIG. 9, an embodiment of the invention on the sending side uses a set of modules specific to each concatenated sub-channel.

For example, the first aggregated packet A-MPDU1 is sent on a first concatenated sub-channel C1 in using:
  modules specific to this first concatenated sub-channel: a scrambler 831, a channel encoder 841, a spatial stream parser 851, an interleaver 861, a binary symbol encoder 871 (implementing for example quadrature amplitude modulation or QAM), a time/space encoder 881;
  modules common to all the concatenated sub-channels: MIMO signal processor 89, OFDM modulator 90 (achieving cyclic shift diversity (CSD), inverse Fourier transform and insertion of a guard interval $\Delta$).

The $N^{th}$ aggregated packet A-MPDUN for its part is sent on the $N^{th}$ concatenated sub-channel CN using:
  modules specific to this $N^{th}$ concatenated sub-channel: scrambler 83N, channel encoder 84N, spatial stream parser 85N, interleaver 86N, binary symbol encoder 87N, time/space encoder 88N;
  modules common to all the concatenated sub-channels listed here above.

Thus, as many specific "branches" are used as there are concatenated sub-channels.

In the same way, on the reception side, an embodiment of the invention uses a set of modules specific to each concatenated sub-channel.

Certain modules are common to all the concatenated sub-channels: OFDM demodulator 91 (elimination of guard interval and Fourier transform), channel estimator 92 and MIMO equalizer 93.

Others are specific to each concatenated sub-channel:
  for the first concatenated sub-channel C1: binary symbol detector 941, deinterleaver 951, inverse spatial stream deparser 961, channel decoder 971, descrambler 981;
  for the $N^{th}$ concatenated sub-channel CN: binary symbol detector 94N, deinterleaver 95N, spatial stream deparser 96N, channel decoder 97N, descrambler 98N.

Once again, as many specific "branches" are used as there are concatenated sub-channels.

In particular, it is noted that these modules, taken in isolation, are well known in the prior art. Their working is therefore not described here.

According to one variant, certain modules common to the different branches are pooled. In this way, the transmission/reception sequence is simplified by eliminating the redundancy of certain functions.

Thus an optimized system is obtained at the level of the reutilization of the resources, as illustrated in FIG. 10.

For example, on the sending side, the modules for spatial stream parsing 85, binary symbol encoding 87 and space/time encoding 88 are pooled. The other modules for scrambling module (831, 83N), channel encoding (841, 84N) and interleaving (861, 86N) remain specific to each concatenated sub-channel.

Similarly, on the reception side, the modules for binary symbol detecting 94 and for the spatial stream deparsing 96 are pooled. The other modules for deinterleaving (951, 95N), channel decoding (971, 97N), and descrambling (981, 98N) remain specific to each concatenated sub-channel.

Naturally, other structures of a device for transmitting or a device for receiving according to the invention can be envisaged without departing from the framework of the invention.

Although the present disclosure has been described with reference to one or more examples, workers skilled in the art will recognize that changes may be made in form and detail without departing from the scope of the disclosure and/or the appended claims.

The invention claimed is:
1. A method comprising:
  transmitting data packets in a communications network using a plurality of radiofrequency channels, said communications network being organized into a plurality of communications layers comprising a data link layer, called a MAC layer, and a physical layer, called a PHY layer, at least two of said radiofrequency channels being concatenated to form one concatenated channel,
  wherein transmitting comprises:

aggregating data packets to be transmitted to a same destination device, at the MAC layer, delivering at least two aggregated packets, with which there is associated a single header of said layer PHY, simultaneously sending said at least two aggregated packets to the same destination device, respectively on at least two distinct concatenated sub-channels, a concatenated sub-channel being formed by at least one of said radiofrequency channels of said concatenated channel.

2. The method according to claim 1 wherein, prior to said step of sending, said single header of said PHY layer is transmitted synchronously on each of said radiofrequency channels forming said concatenated channel.

3. The method according to claim 1, wherein the method comprises a step of signaling the simultaneous sending of said aggregated packets on said concatenated sub-channels.

4. The method according to claim 3, wherein said step of signaling signals at least one of the following pieces of information:
   number of concatenated sub-channels in said concatenated channel;
   radiofrequency channels, each forming concatenated sub-channels;
   number of radiofrequency channels occupied by each aggregated packet;
   type of aggregation implemented.

5. The method according to claim 1, wherein the method comprises a step of inserting a padding sequence after the last data packet of at least one aggregated packet, so that each aggregated packet sent during the step of sending has an identical length.

6. The method according to claim 1, wherein the method comprises a step of sub-dividing a data packet into at least two new data packets known as fragmented packets, and said aggregation step distributes the fragmented packets into at least two distinct aggregated packets.

7. A device for transmitting data packets in a communications network using a plurality of radiofrequency channels, at least two of said radiofrequency channels being concatenated to form a concatenated channel,
   said communications network being organized into a plurality of communications layers comprising a data link layer, called a MAC layer, and a physical layer, called a PHY layer,
   said device comprising:
   means for aggregating data packets to be transmitted to a same destination device, implemented at the level of said MAC layer, delivering at least two aggregated packets, with which a single header of the PHY layer is associated,
   means for simultaneously sending said at least two aggregated packets to the same destination device, respectively on at least two distinct concatenated sub-channels, a concatenated sub-channel being formed by at least one of said radiofrequency channels of said concatenated channel.

8. A method comprising:
   receiving aggregated packets in a communications network using a plurality of radiofrequency channels, said communications network being organized into a plurality of communications layers comprising a data link layer, called a MAC layer, and a physical layer, called a PHY layer, at least two of said radiofrequency channels being concatenated to form a concatenated channel,
   wherein the receiving implements the following steps:
   receiving at least two aggregated packets transmitted to a same destination device respectively on at least two distinct concatenated sub-channels, a concatenated sub-channel being formed by at least one of said radiofrequency channels of said concatenated channel, said aggregated packets, with which there is associated a single header of the PHY layer, resulting from an aggregation of data packets to be transmitted to a same destination, implemented at the level of the MAC layer before sending, and
   for at least one aggregated packet, extracting said data packet or packets forming said aggregated packet.

9. A destination device for receiving aggregated packets in a communications network using a plurality of radiofrequency channels,
   said communications network being organized into a plurality of communications layers comprising a data link layer, called a MAC layer, and a physical layer, called a PHY layer, at least two of said radiofrequency channels being concatenated to form a concatenated channel,
   wherein the destination device comprises:
   means for receiving at least two aggregated packets transmitted to a same destination device respectively on at least two distinct concatenated sub-channels, a concatenated sub-channel being formed by at least one of said radiofrequency channels of said concatenated channel, said aggregated packets with which there is associated a single header of the PHY layer, resulting from an aggregation of data packets to be transmitted to a same destination, implemented at the level of the MAC layer before sending, and
   for at least one aggregated packet, means for extracting said data packet or packets forming said aggregated packet.

10. A method comprising:
    generating a multicarrier signal configured to be sent in a communications network using a plurality of radiofrequency channels said communications network being organized into a plurality of communications layers comprising a data link layer, called a MAC layer, and a physical layer, called a PHY layer, at least two of said radiofrequency channels being concatenated to form a concatenated channel, wherein the signal comprises:
    data associated with an aggregated packet, on carriers belonging to a first concatenated sub-channel, and
    data associated with at least one distinct aggregated packet, on carriers belonging to at least one second concatenated sub-channel;
    a concatenated sub-channel being formed by at least one of said radiofrequency channels of said concatenated channel, and said aggregated packets, with which a single header of the PHY layer is associated, resulting from an aggregation of data packets to be transmitted towards a same destination device, implemented at the level of said MAC layer before sending; and
    transmitting to the same destination device, the signal in the communication network using the plurality of radiofrequency channels.

11. A non-transitory computer-readable medium comprising a computer program recorded thereon and comprising instructions implementing a method, when the instructions are executed by a processor, wherein the method comprises:
    transmitting data packets in a communications network using a plurality of radiofrequency channels, said communications network being organized into a plurality of communications layers comprising a data link layer, called a MAC layer, and a physical layer, called a PHY layer, at least two of said radiofrequency channels being concatenated to form one concatenated channel, wherein transmitting comprises:
aggregating data packets to be transmitted to a same destination device, at the MAC layer, delivering at least two aggregated packets, with which there is associated a single header of said layer PHY, and
simultaneously sending said at least two aggregated packets to the same destination device, respectively on at least two distinct concatenated sub-channels, a concatenated sub-channel being formed by at least one of said radiofrequency channels of said concatenated channel.

12. A non-transitory computer-readable medium comprising a computer program recorded thereon and comprising instructions implementing a method, when the instructions are executed by a processor, wherein the method comprises:
receiving aggregated packets in a communications network using a plurality of radiofrequency channels, said communications network being organized into a plurality of communications layers comprising a data link layer, called a MAC layer, and a physical layer, called a PHY layer, at least two of said radiofrequency channels being concatenated to form a concatenated channel,
wherein the receiving implements the following steps:
receiving at least two aggregated packets transmitted to a same destination device respectively on at least two distinct concatenated sub-channels, a concatenated sub-channel being formed by at least one of said radiofrequency channels of said concatenated channel, said aggregated packets, with which there is associated a single header of the PHY layer, resulting from an aggregation of data packets to be transmitted to a same destination, implemented at the level of the MAC layer before sending, and
for at least one aggregated packet, extracting said data packet or packets forming said aggregated packet.

* * * * *